Sept. 18, 1923.
R. G. AINSWORTH
WEIGHING INSTRUMENT
Filed Aug. 26, 1919   2 Sheets-Sheet 1
1,468,129
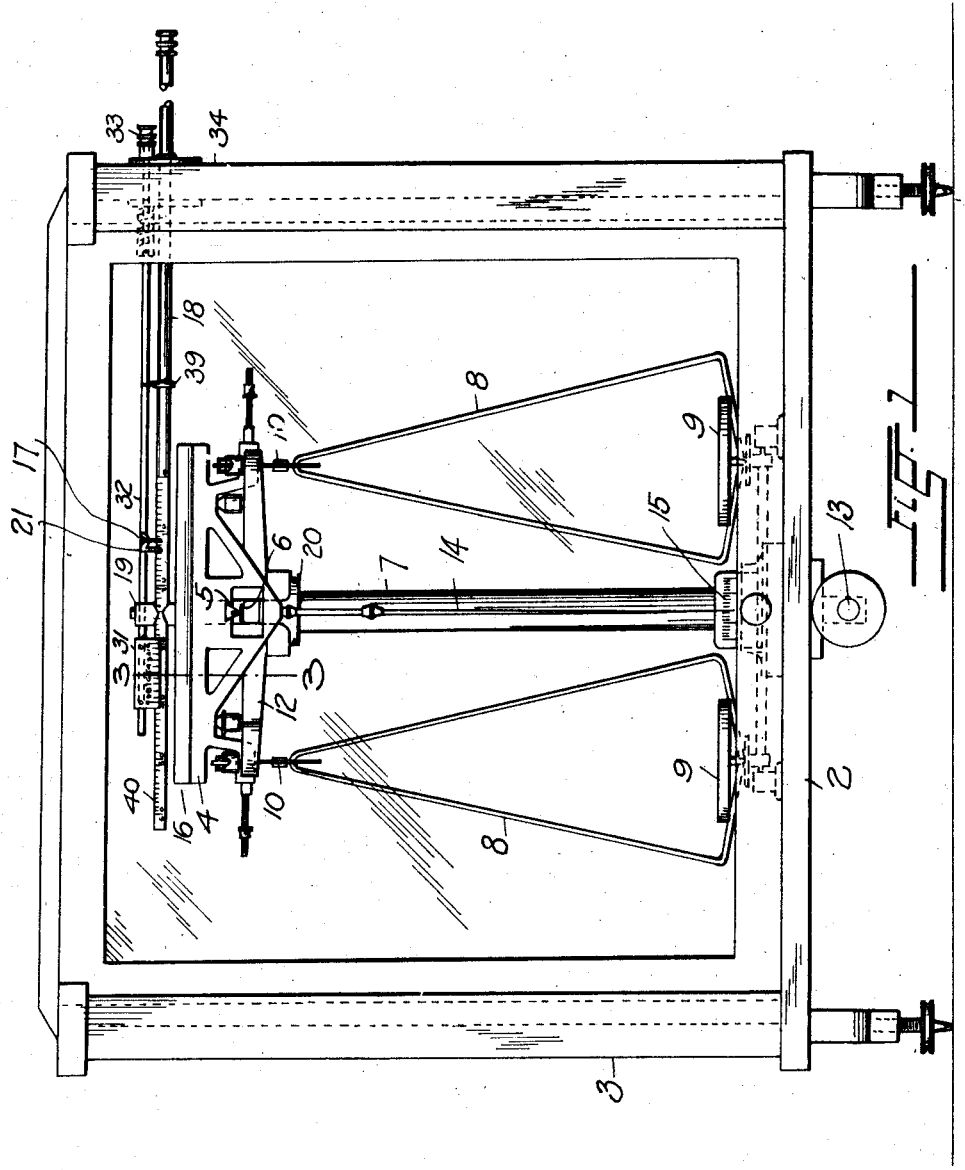
INVENTOR.
R. G. AINSWORTH
BY
ATTORNEY.

Sept. 18, 1923.  1,468,129
R. G. AINSWORTH
WEIGHING INSTRUMENT
Filed Aug. 26, 1919   2 Sheets-Sheet 2
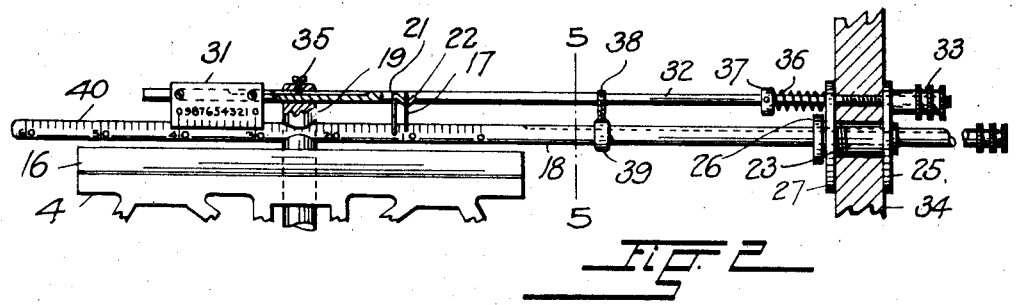
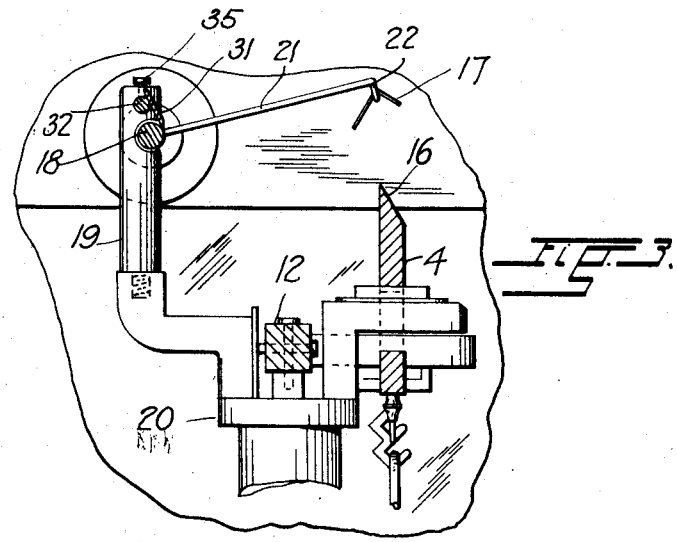
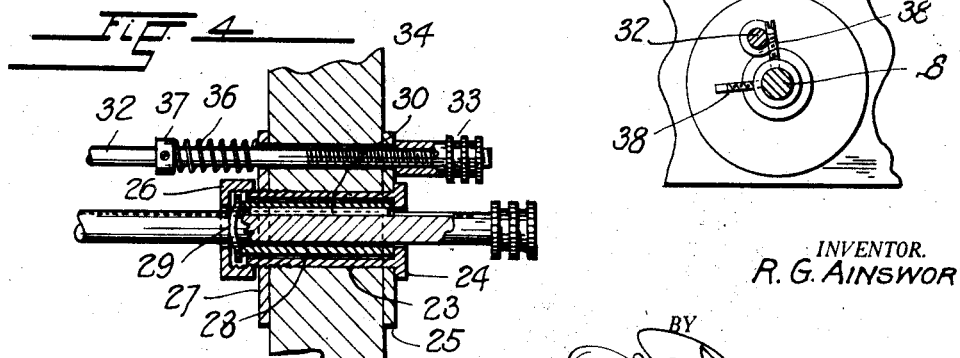
INVENTOR.
R. G. AINSWORTH
BY
ATTORNEY.

Patented Sept. 18, 1923.

1,468,129

UNITED STATES PATENT OFFICE.

ROBERT G. AINSWORTH, OF DENVER, COLORADO.

WEIGHING INSTRUMENT.

Application filed August 26, 1919. Serial No. 319,920.

*To all whom it may concern:*

Be it known that I, ROBERT G. AINSWORTH, a citizen of the United States, residing at Denver, in the county of Denver and State of Colorado, have invented certain new and useful Improvements in Weighing Instruments, of which the following is a specification.

This invention relates to precision weighing instruments and its primary object is to provide in a balance of the type used by chemists and assayers, a vernier appliance of novel construction for the purpose of indicating the weight of a load in fractions of the sub-divisions of a fixed scale or graduated system of standard units of weight.

An embodiment of my invention has been shown in the accompanying drawings in the various views of which like parts are similarly designated, and in which—

Figure 1 represents a front elevation of a balance of conventional construction to which my invention is applied, the weighing mechanism being as usual enclosed in a dust-proof casing;

Figure 2, a partially sectional elevation of the vernier attachment drawn to an enlarged scale;

Figure 3, a further enlarged section taken on the line 3—3, Figure 1;

Figure 4, an enlarged sectional elevation of the bearings in the side of the case of the instrument in which the rider-carrier rod and the vernier rod of the appliance are supported, and Figure 5, an enlarged section taken on the line 5—5, Figure 2.

Referring to the drawings by numeral reference characters, 2 designates a base plate preferably made of glass which constitutes the bottom of a dust-proof casing 3 in which the operating mechanism of the balance is enclosed.

The beam 4 of the instrument is supported through the medium of a knife-edge 5 upon a forwardly extending agate bearing 6 at the upper end of a column 7 which is fixed upon the base plate 2.

The hangers 8 which support the pans 9 of the instrument are suspended from the ends of the beam through the medium of stirrups 10, a releasing yoke 12 at the upper end of a rod extending through the column, is operatively connected with an operating rod 13 beneath the case to lift the beam and the stirrups off their bearings when the instrument is not in operation, and a pan-arrest which likewise is controlled by the operating rod is provided to arrest the motion of the hangers.

A downwardly extending pointer 14 on the beam cooperates with a fixed scale 15 on the base of the column to indicate the position of the beam with relation to the horizontal.

A beveled straight edge 16 on the beam provides a sliding support for a V-shaped rider 17 which cooperates with a graduated carrier rod 18 to indicate in fractions of measuring units, the weight of a load upon one of the pans of the balance.

The carrier rod has a combined rotary and lengthwise sliding movement in a bearing in a wall 34 of the dust-proof casing, and a therewith alined bearing in a post 19 erected upon the cap 20 which covers the upper end of the column, and it has a laterally extending arm 21 provided with a hook-shaped extremity 22 which adapts it to lift the rider off the beam and carry it to any other point thereof.

The bearing in the post 19 is slotted to permit of the passage of this arm and the bearing in the side of the casing is constructed to oppose a lengthwise movement of the rod while it is being rotated to place the rider on the straight edge of the beam.

The bearing consists to this end, as is best shown in Figure 4 of the drawings, of a bushing 23 which is tapped in an opening in the wall of the casing and projects beyond the ends thereof.

A head 24 at one end of the bushing bears upon a cover-plate 25 placed against the side of the wall and a hollow nut 26 is screwed upon the opposite threaded end of the bushing against a similar plate 27 placed against the opposite side of the wall.

A second bushing 28 loosely fitted in the other engages at one of its ends with a spring washer 29 within the nut and it has a feather 30 which extends into a correspondingly formed groove in the portion of the carrier rod extending through the bearing.

It will be seen that when the carrier rod is turned to raise or drop the rider, the feather will bind against a side of the slot in the bushing which by frictional engagement with the spring-washer opposes rotation of the rod.

It follows that the carrier-rod while being rotated is frictionally held against lengthwise motion and thereby permits of the rider being placed upon the straight-edge of the beam at the exact point to which it has been carried by adjustment of the rod.

A vernier 31 fixed at the end of a rod 32 extending above the carrier rod in parallel relation thereto, overlaps the graduated portion of the carrier-rod so that the graduations of its scale, extended to its lower edge, may register with the graduations of the other scale.

The vernier rod is slidably mounted in bearings on the before-mentioned post and the wall of the casing. It is held against rotation by a screw 35 on the post which projects into a longitudinal slot of the rod and its end remote from that at which the vernier is applied, is threaded for the application of an adjusting nut 33 which bears upon the outside of the wall.

A spring 36 coiled around the rod between a collar 37 and a bearing plate on the side of the wall opposite to that engaged by the nut, yieldingly opposes lengthwise movement of the rod when the nut is advanced upon its threaded end, and by subsequent expansion causes the rod to automatically move in the opposite direction when the movement of the nut is reversed.

The rotary motion of the rider-carrying rod is limited by two stops 38 on a collar 39 which extend at opposite sides of the vernier rod.

The V-shaped rider is used in the operation of the instrument for balancing as well as for weighing, the side of the beam at which it is normally positioned being out of balance to the extent of its weight.

The scale 40 on the carrier rod is divided into equal spaces representing standard units of measurement (preferably milligrams) and the vernier scale divides the spaces into fractions (preferably tenths of a milligram).

In the operation of the instrument, after the weighing mechanism has been released by the adjustment of the yoke and the pan arrest through the medium of the operating rod, the rider is moved along the beam by adjustment of the carrier rod until the beam is in balance, the exact balancing position being indicated by the position of the pointer 14 on the beam with relation to the zero point of the index 15 on the base of the column.

After the scale has thus been brought to a condition of equilibrium, the vernier is moved by adjustment of the nut 33 upon the threaded end of its rod until its zero point coincides with that of the scale on the carrier rod after which the load is placed on one of the pans of the instrument and the other pan is weighted to balance the load to a fraction within the measuring capacity of the vernier scale.

The rider is now moved along the straight edge of the beam by adjustment of the carrier-rod until a perfect balance is effected when the graduation of the carrier scale nearest the zero point of the vernier shows the weight in milligrams or other measuring units and the vernier itself shows the fractions thereof.

Having thus described my invention what I claim and desire to secure by Letters-Patent is:

1. In a balance of the character described, a fulcrumed beam having a straight-edge, a rider movably supported thereon, a sliding member adapted to shift the rider and bearing a graduated scale, and an indicatory element cooperating with said scale, and having a lengthwise adjustment with relation thereto.

2. In a balance of the character described, a fulcrumed beam having a straight-edge, a rider movably supported thereon, a sliding member adapted to shift the rider and bearing a graduated scale, and a vernier cooperating with said scale and having a lengthwise adjustment with relation thereto.

3. In a balance of the character described, a fulcrumed beam having a straight-edge, a rider movably supported thereon, a sliding member adapted to shift the rider and bearing a graduated scale, a vernier cooperating with said scale, a threaded rod supporting the vernier, a bearing for said rod, a nut on the rod for its longitudinal movement in one direction, and a return-spring yieldingly opposing said movement.

4. In a balance of the character described, a fulcrumed beam having a straight-edge, a rider movably supported thereon, a sliding member adapted to shift the rider and bearing a graduated scale, a vernier cooperating with said scale, a threaded rod supporting the vernier, a bearing for said rod, a nut on the rod at an end of said bearing, to move the rod longitudinally in one direction, and a spring attached to the rod at the opposite end of the bearing to yieldingly oppose said movement.

5. In a balance of the character described, a fulcrumed beam having a straight-edge, a rider movably supported thereon, a rotary and lengthwise movable carrier-rod having an arm to raise and drop the rider and bearing a graduated scale, a bearing for the rod including a bushing, a spring washer at an end thereof, and a second bushing inside of the other, engaging the washer and having a groove-and-feather connection with the rod, and an indicatory element cooperating with the scale.

6. In a balance of the character described, a fulcrumed beam having a straight-edge, a rider movably supported thereon, a rotary and lengthwise movable carrier-rod having an arm to raise and drop the rider and bearing a graduated scale, a bearing for the rod, including a bushing, a nut screwed at an end thereof, a spring-washer engaging the nut, and a second bushing inside the other, engaging the washer and having a groove-and-feather connection with the rod, and an indicatory element cooperating with the scale.

7. In a balance of the character described, a beam having a straight-edge, a column for the support of the beam, a rider movably supported on the beam, a rotary and lengthwise movable carrier rod having an arm to raise and drop the rider, and a post on the column having a bearing for the rod, which is slotted for the passage of the arm.

8. In a balance of the character described, a fulcrumed beam having a straight edge, a rider, a moving member adapted to shift the rider on the straight edge, and two cooperating scales one of which moves with said member and the other of which is relatively adjustable.

9. In a balance of the character described, a fulcrumed beam having a straight edge, a rider, a rotary and lengthwise movable member to shift the rider on the straight edge, and resilient friction-means resisting longitudinal displacement of the member during its rotation.

10. In a balance of the character described, a fulcrumed beam having a straight edge, a V-shaped rider slidably supported thereon, and a rotary and lengthwise movable carrier-rod having a V-shaped arm adapted to engage at its crotch, the crotch of the rider at its point of contact with the beam, whereby said rider may be raised and lowered and carried to any part of the beam without lateral or rotary displacement.

In testimony whereof I have affixed my signature.

ROBERT G. AINSWORTH.